(12) United States Patent
Tatsumi (10) Patent No.: US 9,300,572 B2
(45) Date of Patent: Mar. 29, 2016

(54) COMMUNICATION SYSTEM AND NETWORK RELAY DEVICE

(71) Applicant: Hitachi Metals, Ltd., Tokyo (JP)

(72) Inventor: Tomoyoshi Tatsumi, Tsuchiura (JP)

(73) Assignee: HITACHI METALS, LTD., Tokyo (JP)

( * ) Notice: Subject to any disclaimer, the term of this patent is extended or adjusted under 35 U.S.C. 154(b) by 146 days.

(21) Appl. No.: 14/061,594

(22) Filed: Oct. 23, 2013

(65) Prior Publication Data

US 2014/0126351 A1   May 8, 2014

(30) Foreign Application Priority Data

Nov. 8, 2012  (JP) .................................. 2012-246197

(51) Int. Cl.
| | |
|---|---|
| *H04L 12/703* | (2013.01) |
| *H04L 29/14* | (2006.01) |
| *H04L 12/939* | (2013.01) |

(52) U.S. Cl.
CPC ............... *H04L 45/28* (2013.01); *H04L 29/14* (2013.01); *H04L 49/557* (2013.01)

(58) Field of Classification Search
None
See application file for complete search history.

(56) References Cited

U.S. PATENT DOCUMENTS

| | | | | |
|---|---|---|---|---|
| 2004/0213292 | A1* | 10/2004 | Willhite et al. | ............... 370/477 |
| 2008/0068985 | A1* | 3/2008 | Mieno | ........................... 370/217 |
| 2014/0112122 | A1* | 4/2014 | Kapadia et al. | ............... 370/219 |

FOREIGN PATENT DOCUMENTS

JP       2008-78893 A      4/2008

OTHER PUBLICATIONS

Japanese Office Action dated Sep. 8, 2015 with English translation.
Nortel Ethernet Routing Switch 8600, Configuration—Link Aggregation, MLT, and SMLT, Release: 7.0; Document Revision: 03.02, pp. 29-33, [online], Apr. 12, 2000, Nortel Networks., [Searched on Aug. 27, 2015], Internet <URL: https://downloads.avaya.com/css/P8/documents/100101820> NN46205-518.

* cited by examiner

*Primary Examiner* — Derrick Ferris
*Assistant Examiner* — Jay Vogel
(74) *Attorney, Agent, or Firm* — McGinn IP Law Group, PLLC.

(57) ABSTRACT

There is provided port switches SWP1 to SWP4, fabric switches SWF1 and SWF2, and user switches SWU1 and SWU2, the port switches SWP1, SWP2 functioning logically as one switch by being connected with a shared communication line between redundancy ports Pr. The port switch SWP2 may receive frames from the user switch SWU1, and when the frames are to be originally transferred from a port P1 to the fabric switch SWF1, the frames are transferred though the redundancy port Pr to the port switch SWP1 if there is a fault on the port P1 side. The port switch SWP1 transfers the frames received from the port switch SWP2 through the redundancy port Pr to the fabric switch SWF1 that is the original transfer destination.

12 Claims, 8 Drawing Sheets

COMMUNICATION SYSTEM AND NETWORK RELAY DEVICE

The present application is based on Japanese patent application No. 2012-246197 filed on Nov. 8, 2012, the entire contents of which are incorporated herein by reference.

BACKGROUND OF THE INVENTION

1. Field of the Invention

The present invention relates to a communication system and a network relay device, and relates to, for example, an effective technique applicable to a communication system in which a link aggregation technique between a network relay device and a plurality of network relay devices in a portion of a system constituted by a plurality of network relay devices is incorporated.

2. Description of the Related Art

For example, Japanese Unexamined Patent Application Publication No. 2008-78893 describes a constitution including a pair of box-type switch devices connected with redundancy ports, and an edge switch (box-type switch) and an aggregation switch (chassis-type switch) connected to the pair of box-type switches. The edge switch is connected to access ports having the same number in the pair of box-type switches in a link aggregation configuration state, and the aggregation switch is connected to network ports having the same port numbers in the pair of box-type switches in a link aggregation configuration state.

SUMMARY OF THE INVENTION

Techniques for constructing a network system by combining a plurality of box-type switch devices instead of chassis-type switch devices have recently become popular. Such a network system is provided with, for example, a plurality of box-type switch devices (referred to as a port switch herein) for assuring a required number of ports, and a plurality of box-type switch devices (referred to as a fabric switch herein) for connections between the port switches. The port switches are connected to each of the fabric switches with communication lines. The fabric switches are connected in a star pattern based on one port switch and the port switches are also connected in a star pattern based on one fabric switch. This type of network system is referred to as a box-type fabric system in the present description.

In this box type fabric system, one port switch, for example, is connected to a plurality of fabric switches through a plurality of communication lines so that link aggregation can be configured for a plurality of ports that become connection sources thereof. Load distribution and redundancy can be achieved within link aggregation when link aggregation is configured. When, for example, there is a demand to increase the communication bandwidth, the communication bandwidth can be easily increased with low costs by installing more fabric switches. Furthermore, in addition to increasing the aforementioned communication bandwidth in the system, the number of ports can also be easily increased with low costs by installing more port switches. As a result, a flexible system that addresses user requirements can be constructed at a low cost through the use of this system in comparison to a system made up of chassis-type switch devices.

However, while redundancy can be assured through the aforementioned link aggregation function when, for example, a fault occurs in a communication line or a fabric switch in the box-type fabric system, there may be a problem in assuring redundancy when a fault occurs in a port switch. Conversely, there exists, for example, a method for realizing device redundancy by interconnecting box-type switch devices and configuring link aggregation for access ports, for example, having the same numbers in the box-type switch devices in the same way as Japanese Unexamined Patent Application Publication No. 2008-78893. This method is referred to as multi-chassis link aggregation in the present description.

The inventors of the present invention examined these advantages and studied the realization of port switch redundancy (fault tolerance improvement) by combining multi-chassis link aggregation with the aforementioned box-type fabric system. As a result, it was found that there is a risk of a reduction in communication bandwidth due to the occurrence of flooding when a fault occurs in a communication line between a port switch and a fabric switch.

The present invention considers this issue and one object thereof is to achieve an improvement in fault tolerance and provide a communication system and a network relay device that are capable of suppressing a reduction in communication bandwidth. These and other objects and new features of the present invention will become apparent from the accompanying drawings and the present description.

An outline of a typical embodiment among the inventions disclosed herein is described below.

A communication system of the present embodiment comprises first to third switches, a first and a second fabric switch, and a user switch. The first and second port switches each comprise a redundancy port, and the redundancy port of the first port switch and the redundancy port of the second port switch are connected by a shared communication line. The user switch is respectively connected to the first and second port switches through different second communication lines, and the ports of the user switch that are the connection sources of the second communication lines are configured for link aggregation. The first to third port switches are each connected to the first and second fabric switches through different first communication lines, and the ports of each of the first to third port switches that are the connection sources of the first communication lines are configured for link aggregation. The ports of the first and second fabric switches, which are the connection sources of the first communication lines connected to the first and second port switches, are configured for link aggregation. When there is no fault, the second port switch transfers an actual data signal received from the user switch through the second communication line to a third port switch through the first communication line between the second port switch and the first fabric switch. When a fault exists in the first communication line between the second port switch and the first fabric switch, the second port switch transfers the actual data signal to the first port switch through the shared communication line. Accordingly, the first port switch transfers the actual data signal received through the shared communication line to the third port switch through the first communication line between the first fabric switch and the first port switch.

An improvement in fault tolerance can be realized and a reduction in communication bandwidth can be suppressed according to the effects achieved by a typical embodiment among the inventions disclosed herein.

DESCRIPTION OF THE PREFERRED EMBODIMENTS

While multiple sections or embodiments are divided in the explanation when required for convenience in the following embodiments, unless otherwise expressed, such divisions are not unrelated to each other and a portion is related to another portion or to all the portions of a modified example, a detail, or a supplementary explanation. When expressing a number (including a quantity, a numerical value, an amount, or a range) of elements in the following embodiments, the element is not limited to that specific number and may be more or less than the specific number unless the specific number is clearly limited in principle or is expressed in particular as such.

Furthermore, it goes without saying that the constituent elements (including element steps) in the following embodiments are not essential unless expressed in particular as such or are clearly considered essential in principle. Similarly, when the shapes, positional relationships and the like of constituent elements are described in the following embodiments, substantially close or similar shapes and the like are included unless expressed in particular as such or are clearly considered essential in principle. The same applies for the above numerical values and ranges.

Embodiments of the present invention described hereinbelow will be explained with reference to the drawings. Similar members are generally provided with similar reference numbers in all of the drawings for describing the embodiments and repetitious explanations will be omitted.

The matter studied as an assumption will be explained with reference to FIGS. 6 to 8 before the explanation of the communication system according to the present embodiment.

<<Outline of Box-Type Fabric System>>

Figure 6:
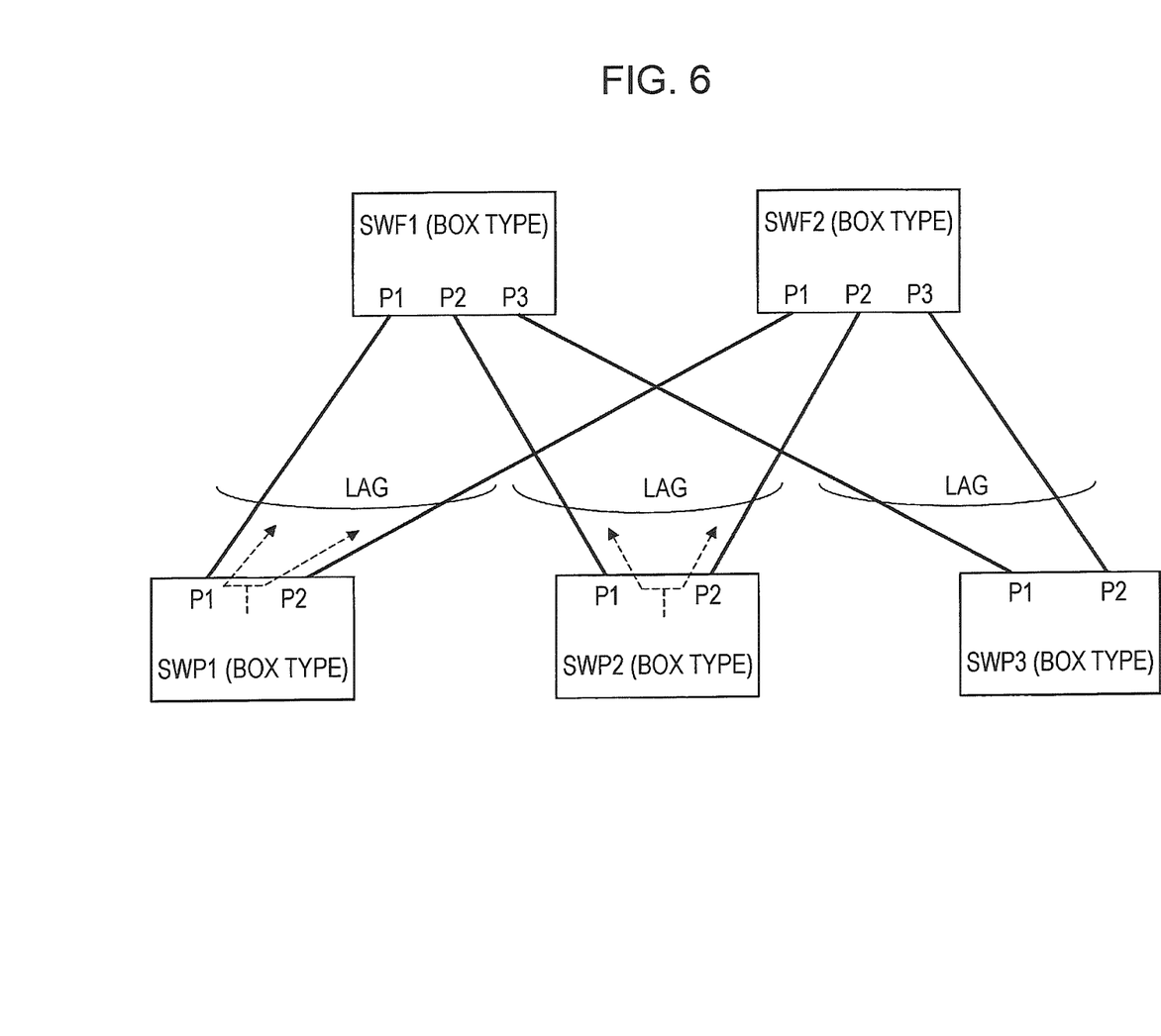
FIG. 6 is a schematic view illustrating an example of a box-type fabric system studied under the assumption of the present invention.

FIG. 6 is a schematic view illustrating an example of a box-type fabric system studied under the assumption of the present invention. As illustrated in FIG. 6, the box-type fabric system is provided with a plurality (three in this case) of port switches SWP1 to SWP3 made up of box-type switch devices, and a plurality (two in this case) of fabric switches SWF1 and SWF2 made up of box-type switch devices.

The port switches SWP1 to SWP3 are each connected to the fabric switches SWF1 and SWF2 through different communication lines (first communication lines). Specifically, a port P1 and a port P2 of the port switch SWP1 are respectively connected to a port P1 of the fabric switch SWF1 and a port P2 of the fabric switch SWF2 through different communication lines. The port P1 and the port P2 of the port switch SWP2 are respectively connected to the port P2 of the fabric switch SWF1 and the port P2 of the fabric switch SWF2 through different communication lines, and similarly, the port P1 and the port P2 of the port switch SWP3 are respectively connected to the port P3 of the fabric switch SWF1 and the port P3 of the fabric switch SWF2 through different communication lines. The port switches and the fabric switches, while not limited in particular, are realized, for example, with the same box-type switch device constitution, and can be selected to function as a port switch or as a fabric switch through an internal configuration.

For example, one port switch (e.g., SWP1) in the box-type fabric system is connected to the plurality of fabric switches SWF1 and SWF2 via a plurality (two in this case) of communication lines (first communication lines), and link aggregation can be configured for the ports P1 and P2 that are connection sources thereof. In the present description, a collection of ports (P1 and P2 in this case) configured as link aggregation is referred to as a link aggregation group LAG. Load distribution and redundancy can be achieved within the link aggregation group LAG when link aggregation (a link aggregation group LAG) is configured.

For example, when transmitting frames from the port switch SWP1 to the port switch SWP3, the frames are distributed appropriately among a communication path from the port switch SWP1 port P1 through the fabric switch SWF1 to the port switch SWP3 and a communication path from the port switch SWP1 port P2 through the fabric switch SWF2 to the port switch SWP3 on the basis of a certain rule. Although not limited in particular, the certain rule may include a method for computing using, for example, an address in header information (specifically, a transmission source and/or destination media access control (MAC) address or, additionally, a transmission source and/or destination IP address) inside the frame. Ports configured as a link aggregation group LAG are assumed logically (virtually) to be one port, and, for example, a return path in which a broadcast frame inputted to the port P1 of the port switch SWP1 is outputted to the port switch SWP1 port P2 is blocked.

Figure 7:
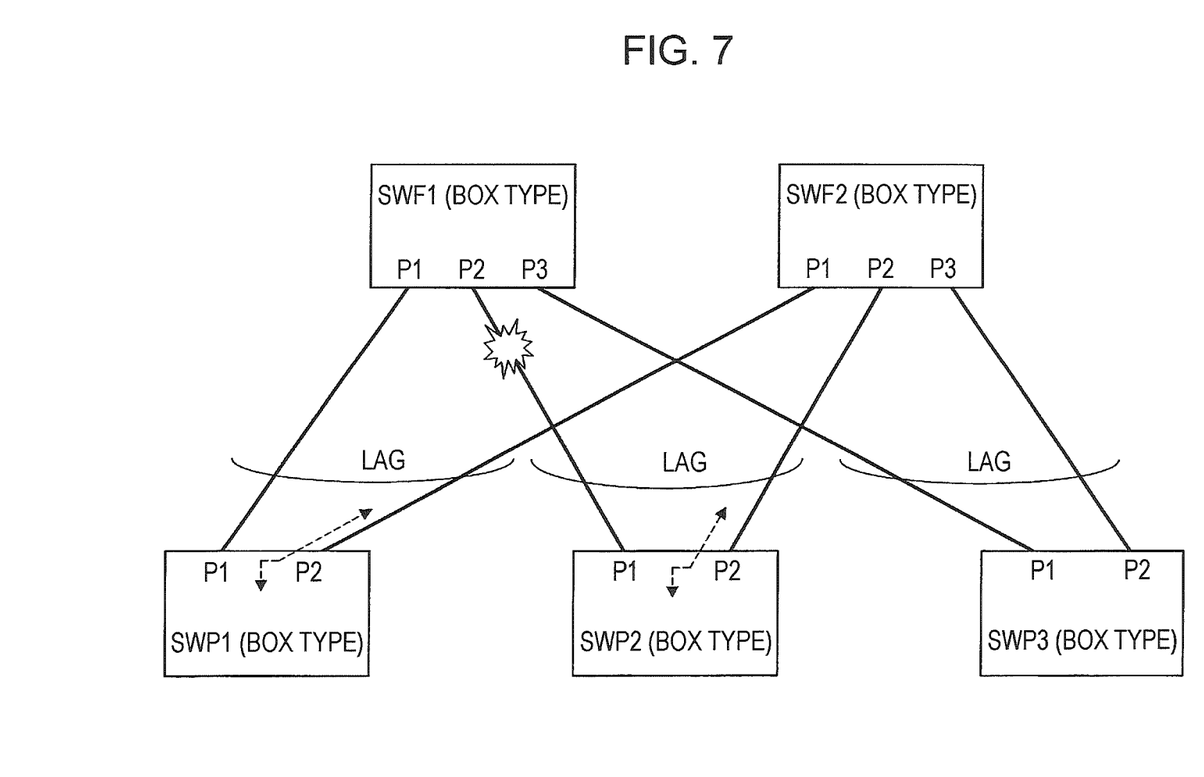
FIG. 7 describes an operation example when a fault occurs in a communication line in FIG. 6.

FIG. 7 describes an operation example when a fault occurs in a communication line in FIG. 6. FIG. 7 exemplifies a case in which a fault occurs in a communication line between the port P1 of the port switch SWP2 and the port P2 of the fabric switch SWF1. In this case, since the port switch SWP2 cannot communicate via the fabric switch SWF1, the fabric switch SWF1 is configured as a disabled state (e.g., ports P1 to P3 are in a blocked state), and communication between the port switches SWP1 to SWP3 is aggregated onto a path through the fabric switch SWF2.

<<Combination of Box-Type Fabric System and Multi-Chassis Link Aggregation>>

Figure 8:
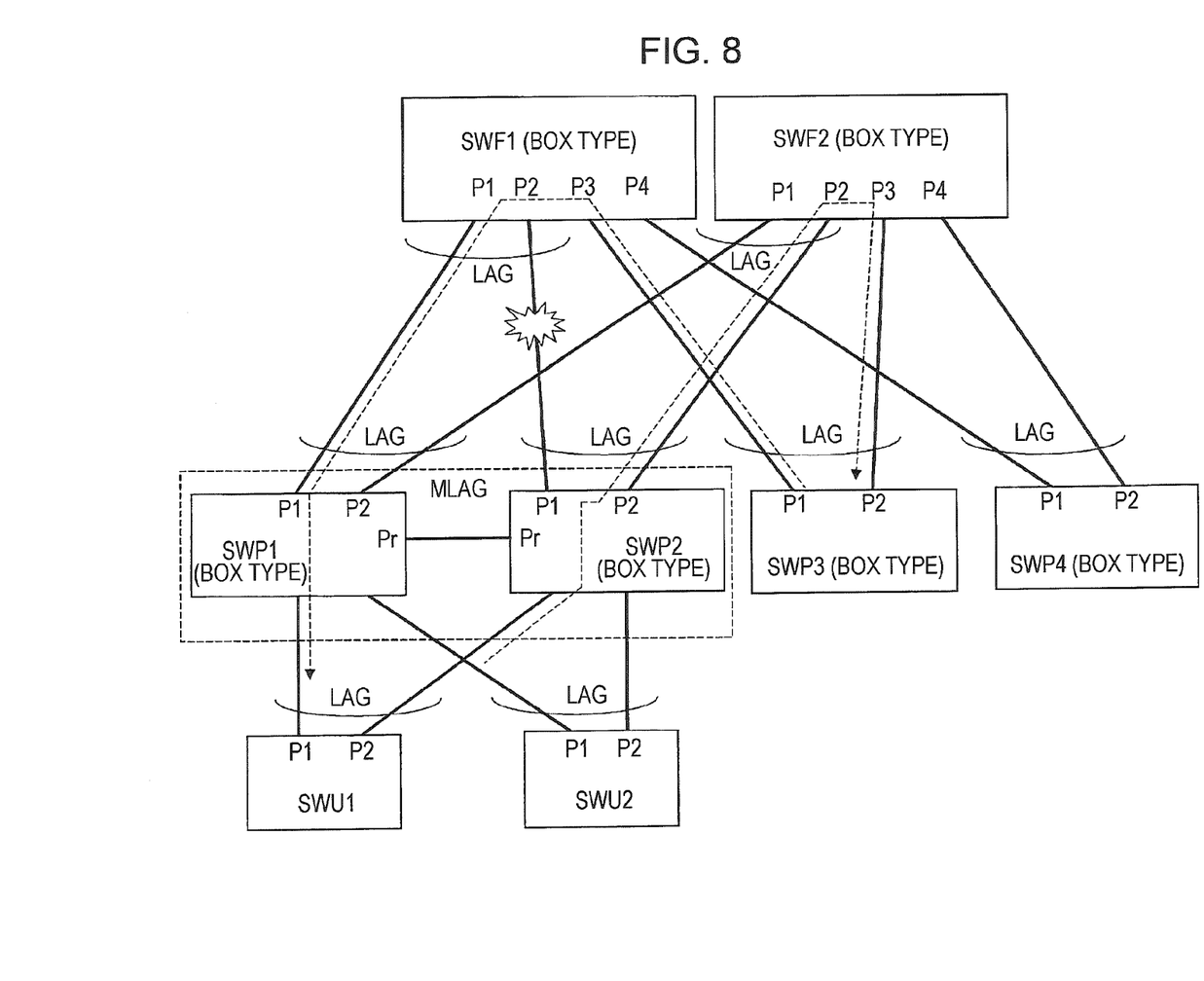
FIG. 8 is a schematic view illustrating an example when a multi-chassis link aggregation is applied to the box-type fabric system in FIG. 6, and describes an example of a problem when a fault occurs in FIG. 7.

FIG. 8 is a schematic view illustrating an example when a multi-chassis link aggregation is applied to the box-type fabric system in FIG. 6, and describes an example of a problem when a fault occurs in FIG. 7. In FIG. 8, in addition to the configuration example in FIG. 7, the port switch SWP1 and the port switch SWP2 are each provided with a redundancy port Pr, and multi-chassis link aggregation is configured due to the port switches SWP1 and SWP2 being connected with a shared communication line between the redundancy ports Pr. In the present description, the aggregation of the port switches SWP1 and SWP2 configured as the multi-chassis link aggregation is referred to as a multi-chassis link aggregation group MLAG.

Further, in FIG. 8, user switches SWU1 and SWU2 are connected to the SWP1 and the SWP2 which are configured as the multi-chassis link aggregation group MLAG. The ports P1 and P2 of the user switch SWU1 are connected to switches SWP1 and SWP2 through different communication lines (second communication lines), and the ports P1 and P2 that are the connection sources are configured as the link aggregation group LAG. The ports P1 and P2 of the user switch SWU2 are connected to switches SWP1 and SWP2 through different communication lines (second communication lines), and the ports P1 and P2 that are the connection sources are configured as the link aggregation group LAG.

Frames from the user switch SWU1 are distributed and transmitted on the port P1 side or the port P2 side of the user switch SWU1 on the basis of a certain rule associated with the link aggregation group LAG. Similarly, frames from the user switch SWU2 are distributed and transmitted on the port P1 side or the port P2 side of the user switch SWU2 on the basis of the certain rule. The port switches SWP1 and SWP2 configured as the multi-chassis link aggregation group MLAG transmit and receive, for example, each others states and address table (Forwarding database: FDB) information and the like between the redundancy ports Pr and function logically (virtually) as one switch. By using this multi-chassis link aggregation, improvements in fault tolerance can be achieved in addition to improvements in communication bandwidth through load distribution. For example, even if a fault occurs in the port switch SWP1, the transfer of frames to or from user switches SWU1 and SWU2 can be carried out by the port switch SWP2 aggregately.

To facilitate explanation in FIG. 8, a port switch SWP4 is added to the configuration example of FIG. 7. A port P1 of the port switch SWP4 is connected to the port P4 of the fabric switch SWF1 through a communication line, and a port P2 of the port switch SWP4 is connected to the port P4 of the fabric switch SWF2 through a communication line. The number of port switches in the present embodiment may be three or more (two thereof being configured as a MLAG), and the number of fabric switches may be two or more.

According to this example, the port switches SWP1 and SWP2 configured as a multi-chassis link aggregation group MLAG as described above function logically as one switch. Therefore, for example, the one switch and the fabric switch SWF1 in the configuration example in FIG. 8 are connected with two communication lines (between the fabric switch SWF1 and the port switch SWP1, and between the fabric switch SWF1 and the port switch SWP2). In this case, the ports P1 and P2 of the fabric switch SWF1, which are the connection sources of the two communication lines, are configured as a link aggregation group LAG. Consequently, as illustrated in FIG. 8, even if a fault occurs in, for example, a communication line between the fabric switch SWF1 and the port switch SWP2, there is no need to disable the fabric switch SWF1 as indicated in FIG. 7 so long as faults do not occur in both of the communication lines between the multi-chassis link aggregation group MLAG and the fabric switch SWF1.

Here, the fabric switch SWF1 is assumed to be in an enabled state and a case is considered in which, for example, frames are transferred between the user switch SWU1 and the port switch SWP3. It is also assumed that a transmission source MAC address "A" and a destination MAC address "B" are included in the frames transmitted from the user switch SWU1, and conversely a transmission source MAC address "B" and a destination MAC address "A" are included in the frames transmitted from the port switch SWP3. The transmission source MAC address "A" is a MAC address of the user switch SWU1 (a terminal (server), etc. (not illustrated) connected thereto), and the destination MAC address "B" is a MAC address of the port switch SWP3 (a terminal (server), etc. (not illustrated) connected thereto). In this case, it is assumed that a communication path is determined when transferring the frames in accordance with the MAC addresses "A" and "B", and communication before a fault occurrence is determined to be the communication path SWU1⇆SWP2⇆SWF1⇆SWP3. Accompanying this communication, the fabric switch SWF1 registers the port P2 and the MAC address "A" association, and the port P3 and the MAC address "B" association in an address table (FDB) of the fabric switch SWF1.

As illustrated in FIG. 8, the case of an occurrence of a fault in the communication line between the port switch SWP2 and the fabric switch SWF1 in this state is considered. In this case, first, a frame "AB" including the transmission source MAC address "A" and the destination MAC address "B" is transferred from the user switch SWU1 to the port switch SWP2. The port switch SWP2 transfers the frame "AB" to the fabric switch SWF2 on the basis of the link aggregation group LAG configured for the ports P1 and P2 since a fault exists in the communication line between the port switch SWP2 and the fabric switch SWF1. Accordingly, the fabric switch SWF2 registers the port P2 and the MAC address "A" association in the address table (FDB) of the fabric switch SWF2. However, the fabric switch SWF2 outputs the frame "AB" from the ports P3 and P4 since the port corresponding to the destination MAC address "B" is not acknowledged. Specifically, flooding occurs.

Conversely, since the fabric switch SWF1 is in an enabled state, the frame "BA" including the transmission source MAC address "B" and the destination MAC address "A" is transferred from the port switch SWP3 to the fabric switch SWF1 on the basis of the abovementioned communication path before the occurrence of the fault. The fabric switch SWF1 transfers the frame "BA" to the port switch SWP1 on the basis of the link aggregation group LAG configured for the ports P1 and P2 since a fault exists in the communication line between the port switch SWP2 and the fabric switch SWF1. The fabric switch SWF1 acknowledges the association between the port P2 and the destination MAC address "A" associated with the abovementioned communication before the fault occurrence, and acknowledges the association between the port P1 and the destination MAC address "A" due to the link aggregation group LAG.

Here it is assumed, for example, that the transfer of the frame "AB" and the frame "BA" is carried out continuously. In this case, the fabric switch SWF2 invokes the flooding each time the frame "AB" is received from the port switch SWP2 since no frame "BA" is received from the port switch SWP3. The fabric switch SWF1 further erases the association relationships between the port P1 and the MAC address "A" in the address table (FDB) therein over a certain period of time using an aging function since no frames "AB" are received from the user switch SWU1. Consequently, the fabric switch SWF1 invokes flooding thereafter each time a frame "BA" is received from the port switch SWP3. Accordingly, there is a risk of a reduction in communication bandwidth between a port switch and a fabric switch due to multiple occurrences of flooding.

<<Operation and Configuration of Communication System Based on Present Embodiment (when No Fault Occurs)>>

Figure 1:
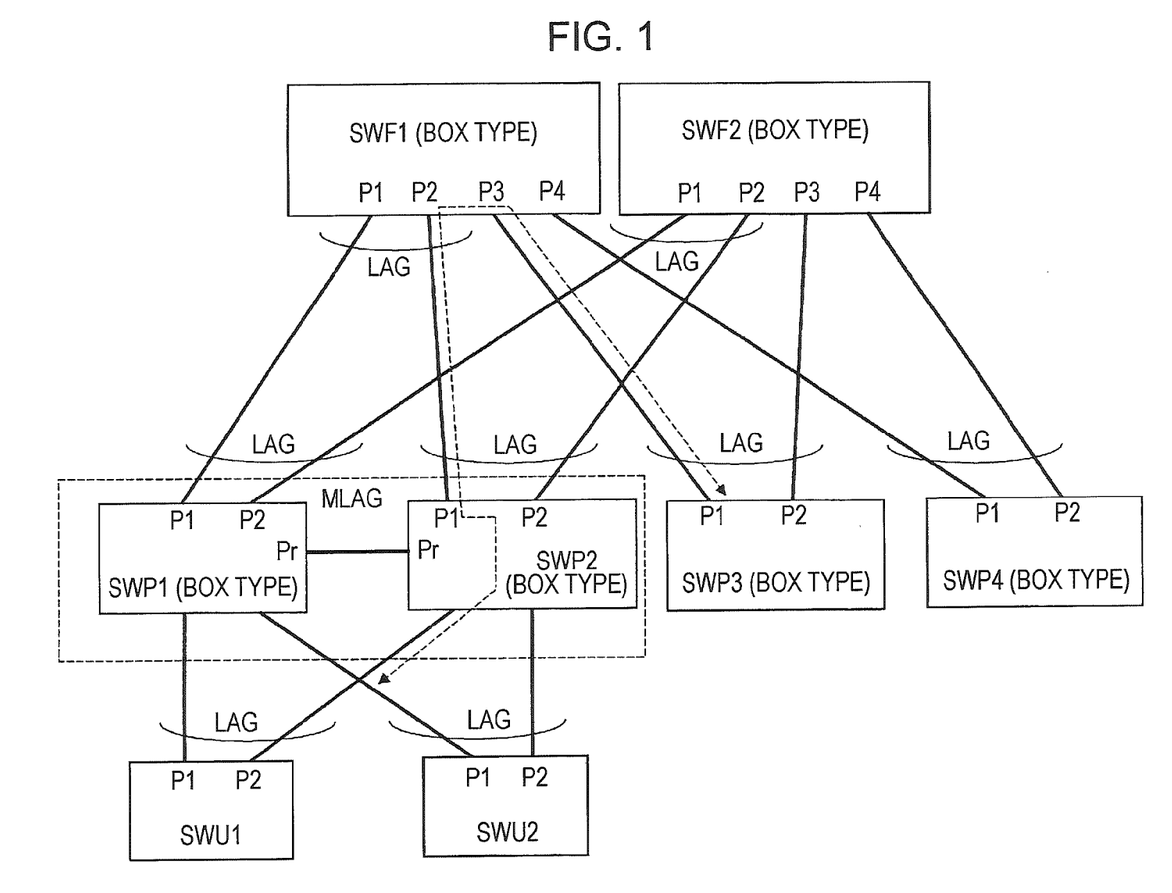
FIG. 1 is a schematic view illustrating an example of a communication system according to a first embodiment of the present invention, and illustrates an operation example when there is no fault.

FIG. 1 is a schematic view illustrating an example of a communication system according to a first embodiment of the present invention, and illustrates an operation example when there is no fault. The communication system illustrated in FIG. 1 includes the same configuration as described above in FIG. 8, and includes a plurality (two in this case) of fabric switches SWF1 and SWF2 (first fabric switch and second fabric switch), a plurality (four in this case) of port switches SWP1 to SWP4 (first port switch to fourth port switch), and user switches SWU1 and SWU2. The fabric switches SWF1 and SWF2, and the port switches SWP1 to SWP4 are each realized by box-type switch devices as described above and altogether constitute a box-type fabric system. The fabric switches SWF1 and SWF2, and the port switches SWP1 to SWP4 are all network relay devices. The port switches SWP1 and SWP2 are configured as the multi-chassis link aggregation group MLAG as described above.

The user switches SWU1 and SWU2 are connected respectively to the port switches SWP1 and SWP2 through different communication lines (second communication lines), and the user switches SWU1 and SWU2 configure the ports P1 and P2 that are the connection sources of the communication lines as the link aggregation group LAG. The port switches SWP1 to SWP4 are each connected to the fabric switches SWF1 and SWF2 via different communication lines (first communication lines), and the port switches SWP1 to SWP4 configure the ports P1 and P2 (first and second ports) that are the connection sources of the communication lines as the link aggregation group LAG. The respective ports P1 and P2 of the fabric switches SWF1 and SWF2, that are the connection sources of the communication lines between the fabric switches SWF1, SWF2 and the port switches SWP1, SWP2 configured as the multi-chassis link aggregation group MLAG, are configured as link aggregation groups LAG.

The port switches SWP1 and SWP2 receive frames (actual data signals) respectively from the user switches SWU1 and SWU2, and the frames are transferred to one of the fabric switches SWF1 and SWF2 on the basis of the certain rule associated with the link aggregation group LAG. For example, when a method of computing on the basis of the transmission source MAC addresses and the destination MAC addresses in the header information in the frames is used as the certain rule, the port switches SWP1 and SWP2, upon receiving the plurality of frames, each transfer the frames including the same transmission source MAC address and the same destination MAC address using the same port numbers of the ports P1 and P2.

FIG. 1 illustrates an example of a communication path between the user switch SWU1 and the port switch SWP3. In this example, as described in FIG. 8, upon receiving the frames (actual data signals) "AB" that includes the transmission source MAC address "A" and the destination MAC address "B" from the user switch SWU1, the port switch SWP2 selects the port P1 side by computing on the basis of the MAC address "A" and the MAC address "B". The port switch SWP2 then transfers the frames (actual data signals) "AB" received from the user switch SWU1 to the port switch SWP3 through the communication line (first communication line) between the port switch SWP2 and the fabric switch SWF1.

Conversely, upon receiving frames (actual data signals) "BA" that include the transmission source MAC address "B" and the destination MAC address "A" from a terminal (not illustrated) connected to the port switch SWP3, the port switch SWP3 selects the port P1 side on the basis of the same rule as the port switch SWP2. The port switch SWP3 then transfers the frames (actual data signals) "BA" to the port switch SWP2 and the user switch SWU1 through the communication line (first communication line) between the port switch SWP3 and the fabric switch SWF1. If there is no fault in this case, communication from the user switch SWU1 to the port switch SWP3 and communication in the reverse direction are both carried out on the path through the fabric switch SWF1. As a result, the information of the MAC address "A" and the MAC address "B" in the address table (FDB) of the fabric switch SWF1 is not erased and flooding does not occur beyond the initial stage of communication.

<<Operation and Configuration of Communication System Based on Present Embodiment (when a Fault Occurs)>>

Figure 2:
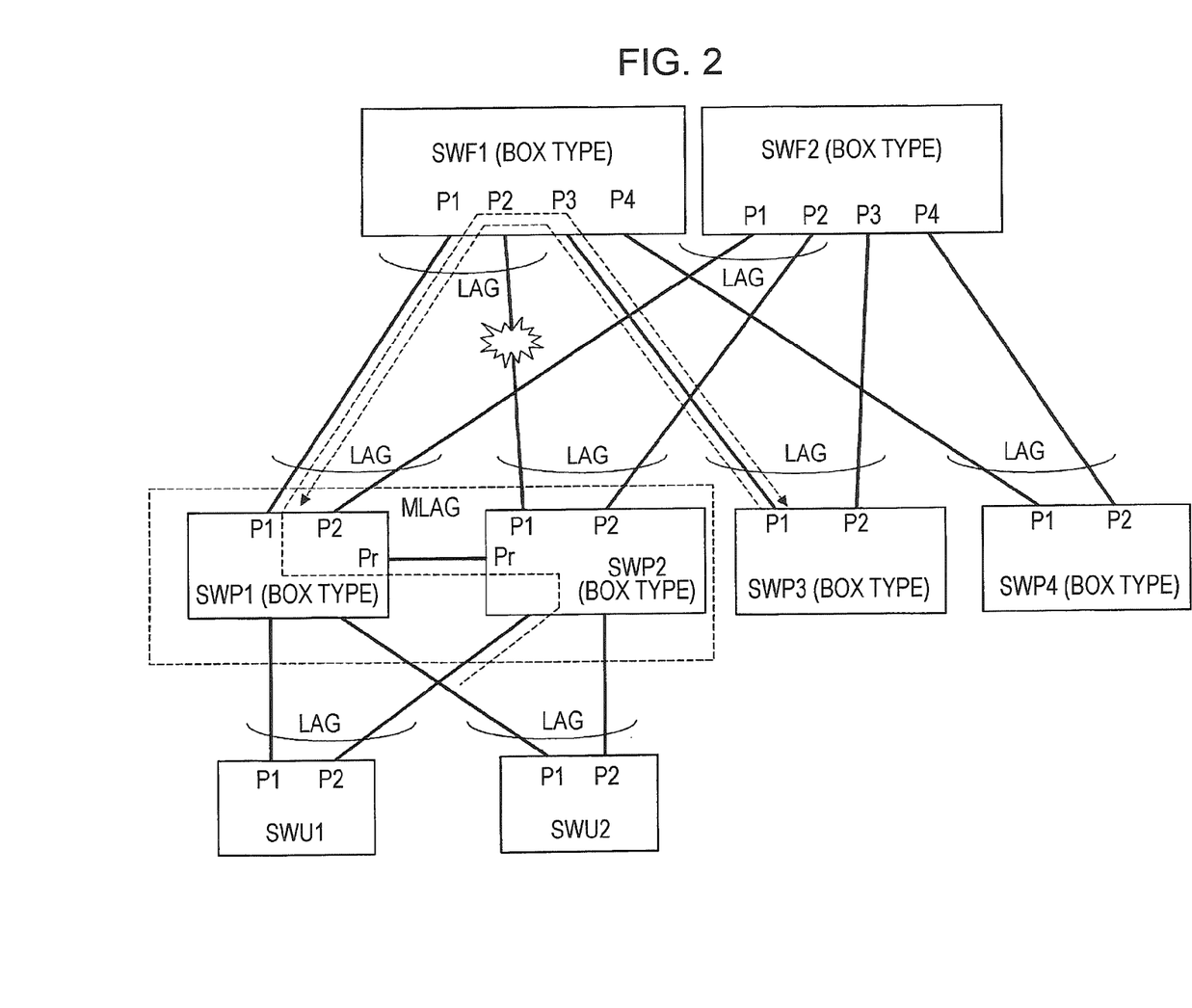
FIG. 2 illustrates an operation example when a fault has occurred assuming the operation when there is no fault in FIG. 1 in the communication system of FIG. 1.

FIG. 2 illustrates an operation example when a fault has occurred in the communication system of FIG. 1 assuming the operation when there is no fault in FIG. 1. In FIG. 2, a fault occurs in the communication path (the communication line (first communication line) in this case) between the port P2 of the fabric switch SWF1 and the port P1 of the port switch SWP2 in the same way as the example in FIG. 8. The port switch SWP2 receives, for example, frames from the user switch SWU1. If the frames are ones (that is, the aforementioned frames (actual data signals) "AB") to be transferred over the communication line (first communication line) between the port P1 and the fabric switch SWF1, the port switch SWP2 transfers the frames from the redundancy port Pr through the shared communication line to the port switch SWP1.

Upon receiving the frames (actual data signal) "AB" through the shared communication line from the port switch SWP2, the port switch SWP1 transfers the frames to the transfer destination (that is, the fabric switch SWF1) that is the same as the original transfer destination of the port switch SWP2. As a result, the frames (actual data signal) "AB" are transferred to the port switch SWP3 through the communication line (first communication line) between the port switch SWP1 and the fabric switch SWF1. Since the port having the same port number in the port switches SWP1 and SWP2 is connected to the same fabric switch in FIG. 2, the port switch SWP1 transfers the frames (actual data signal) "AB" from the port switch SWP2 through the port P1 having the same port number as the port of the port switch SWP2 when the port P1 is originally selected in the port switch SWP2.

Conversely, as explained in FIG. 1 and FIG. 8, when the port switch SWP3 receives the frames (actual data signal) "BA" from a terminal connected thereto, the port switch SWP3 transfers the frames from the port P1 to the fabric switch SWF1. The fabric switch SWF1 transfers the frames from the port P1 to the port switch SWP1 on the basis of the link aggregation group LAG configured for the ports P1 and P2 since a fault occurs in the port P2.

As a result, a communication path for the frames "AB" and the frames "BA" to pass through the same fabric switch SWF1 is created, and multiple occurrences of flooding as described in FIG. 8 can be prevented even if a fault exists and the accompanying reduction in communication bandwidth can be suppressed. Considering only a box-type fabric system in FIG. 2, since the port P1 and the port P2 of the port switch SWP2 are configured as a link aggregation group LAG, when a fault occurs at the port P1 side of the port switch SWP2 as represented in FIG. 7, the port P2 side of the port switch SWP2 is used for transferring the frames. Considering only the multi-chassis link aggregation in FIG. 2, for example, the transfer of frames (frames that are actual data signals (i.e., user frames) and not control frames) through the redundancy port Pr is not carried out so long as faults do not occur in both the ports P1 and P2 of the port switch SWP2. Conversely, according to the present invention, in the operation in FIG. 2, the transfer of frames (actual data signal) through the redundancy port Pr is carried out regardless of the case in which faults do not occur in both the ports P1 and P2 of the port switch SWP2.

Figure 3:
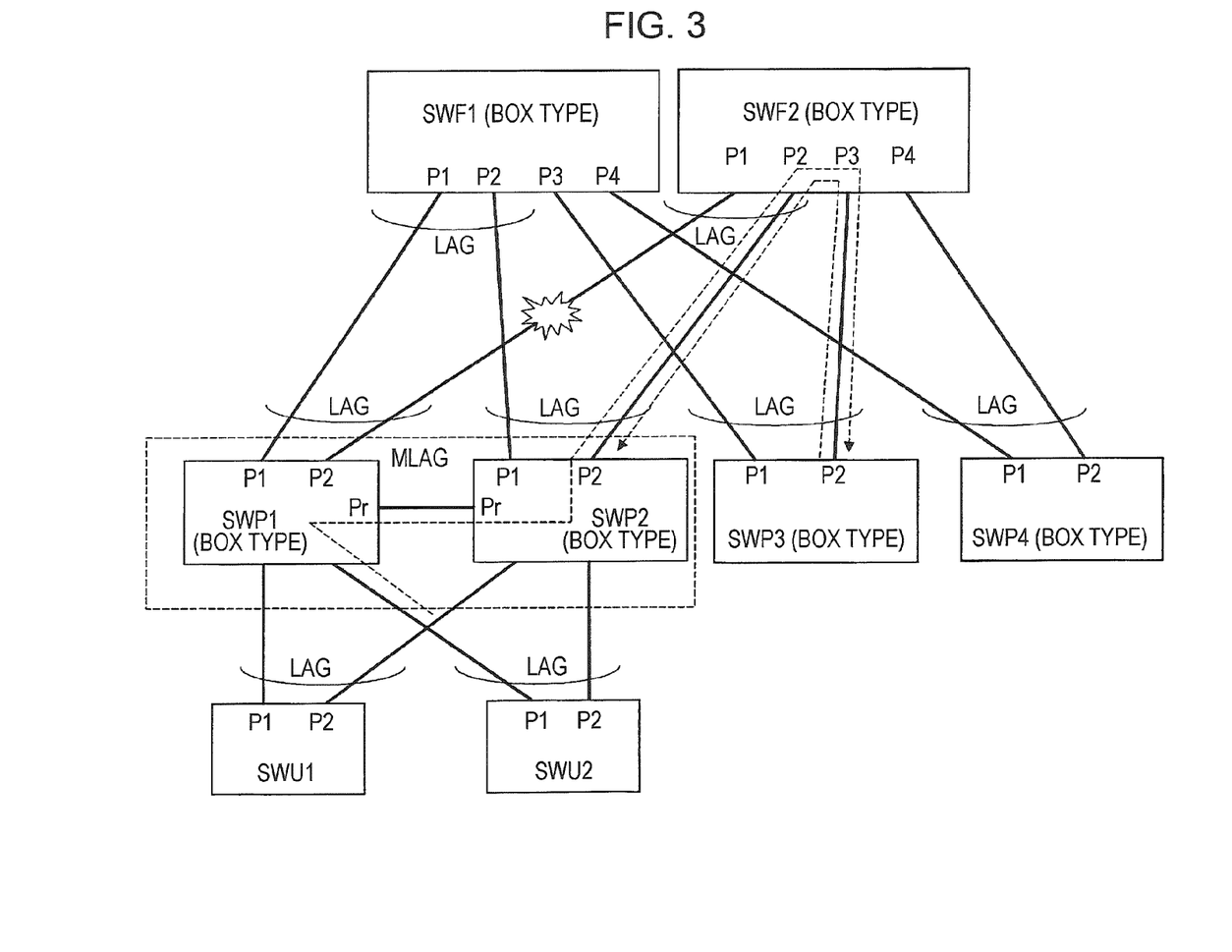
FIG. 3 illustrates an operation example when a fault has occurred in a location different from that of FIG. 2 in the communication system of FIG. 1.

FIG. 3 illustrates an operation example when a fault has occurred in a location different from that of FIG. 2 in the communication system of FIG. 1. In FIG. 3, when communication is assumed to be carried out between the user switch SWU2 and the port switch SWP3 and there is no fault, a communication path SWU2⇆SWP1⇆SWF2⇆SWP3 is generated on the basis of the certain rule using the transmission source MAC address and the destination MAC address in the same way as in the case in FIG. 1. In this state as illustrated in FIG. 3, it is assumed that a fault occurs in the communication path (the communication line (first communication line) in this case) between the port P1 of the fabric switch SWF2 and the port P2 of the port switch SWP1. When the port switch SWP3 transfers the frames (actual data signals) to the user switch SWU2, the frames (actual data signals) are transferred from the port P2 to the fabric switch SWF2 in the same way as if there is no fault. The fabric switch SWF2 transfers the frames from the port P2 to the port switch SWP2 on the basis of the link aggregation group LAG configured for the ports P1 and P2 since a fault occurs at the port P1.

Conversely, when the port switch SWP1 transfers the frames (actual data signals) to the port switch SWP3, if the frames from the user switch SWU2 were originally to be transferred from the port P2 of the port switch SWP1, the port switch SWP1 transfers the frames from the redundancy port Pr through the shared communication line to the port switch SWP2. When the port switch SWP2 receives, through the shared communication line, the frames originally to be transferred from the port P2 of the port switch SWP1, the port switch SWP2 transfers the frames to the fabric switch SWF2 through the port P2 that has the same number as the port of the port switch SWP1. As a result, multiple occurrences of flooding as described in FIG. 8 can be prevented even if a fault exists and an accompanying reduction in communication bandwidth can be suppressed since the communication in both directions between the user switch SWU2 and the port switch SWP3 is carried out through the same fabric switch SWF2.

As described above, by performing the operations illustrated in FIGS. 1 to 3 using the communication system as in FIG. 1, an improvement in fault tolerance is demonstrated. Specifically, an improvement in fault tolerance accompanying device redundancy using the multi-chassis link aggregation as described in FIG. 8 and an improvement in fault tolerance due to the assurance of an alternate path when a fault occurs in a communication line between a port switch and a fabric switch as described in FIGS. 2 and 3, are demonstrated. Furthermore, a reduction in communication bandwidth due to flooding can be suppressed by providing a function (that is, the transfer function between the redundancy ports Pr in FIG. 2) for carrying out communication between two terminals (e.g., a MAC address "A" terminal and a MAC address "B" terminal) via a same fabric switch (e.g., the fabric switch in FIG. 2) when assuring the alternate path.

<<Outline of Port Switch (Network Relay Device)>>

Figure 4:
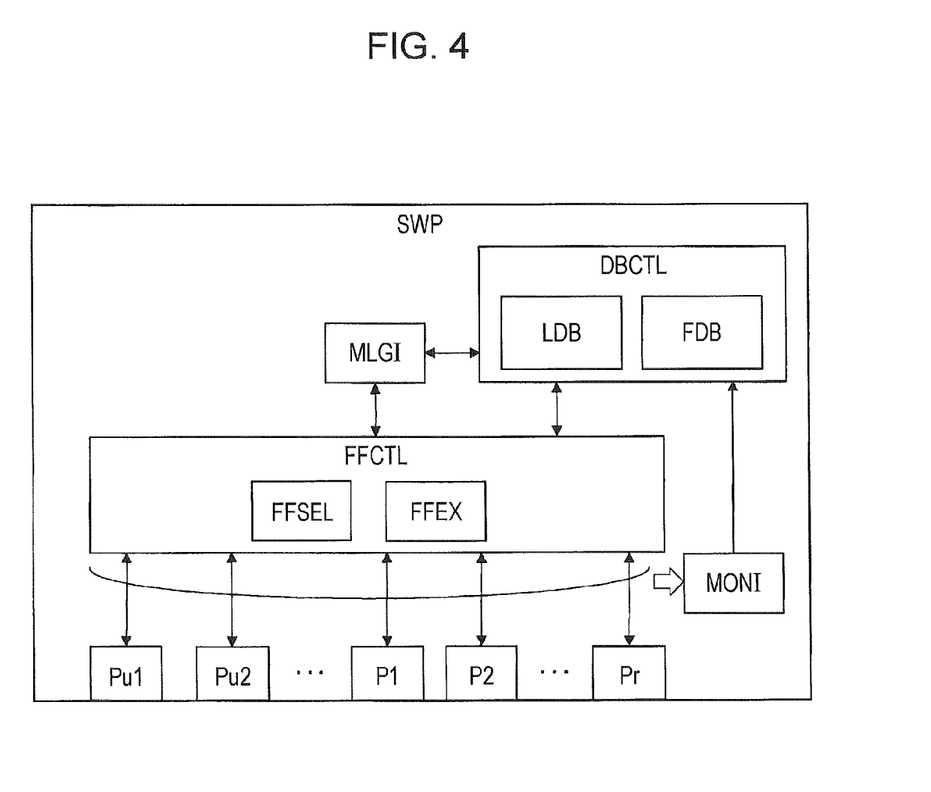
FIG. 4 is a block diagram illustrating a schematic example of principal components of a port switch in the communication system of FIG. 1.

FIG. 4 is a block diagram illustrating a schematic example of principal components of a port switch in the communication system of FIG. 1. The port switch (network relay device) SWP illustrated in FIG. 4 includes, for example, a frame transfer control unit FFCTL, a port monitoring unit MONI, a database control unit DBCTL, a multi-chassis link aggregation information retaining unit MLGI, and a plurality of ports (Pu1, Pu2, ..., P1, P2, ..., Pr). The ports Pu1, Pu2, ... are user switch oriented ports, and the ports Pu1 and Pu2 are respectively connected to the user switches SWU1, SWU2 based on the example of the port switch SWP1 in FIG. 1. The ports P1, P2, ... are fabric switch oriented ports, and the port P1 and the port P2 (first and second ports) are respectively connected to the fabric switches SWF1 and SWF2 based on the example of the SWP1 in FIG. 1. The port Pr is a redundancy port, and based on the example of the port switch SWP1 in FIG. 1 the port Pr is connected to the port switch SWP2.

While two user switch oriented ports Pu1 and Pu2 are illustrated as representatives here, three or more user switch oriented ports are accordingly provided if three or more user switches are connected thereto. Similarly, while two fabric switch oriented ports P1 and P2 are illustrated as representatives here, three or more fabric switch oriented ports are accordingly provided if three or more fabric switches are connected thereto. Redundancy ports Pr are provided in each of the port switches SWP1 and SWP2 configured as a multi-chassis link aggregation group MLAG as described in the example in FIG. 1. However, if, for example, the port switches SWP1 to SWP4 are realized by a box-type switch device of the same configuration, the port switches SWP3 and SWP4 are not necessarily provided with redundancy ports Pr and in this case the redundancy ports Pr may be used as user switch oriented ports or fabric switch oriented ports.

The port monitoring unit MONI detects the presence or absence of a fault in the ports (Pu1, Pu2, ..., P1, P2, ..., Pr). Although not limited in particular, the detecting, for example, may include detecting whether the size of a received signal level is within a certain range, or detecting the possibility of transmission and reception by using a certain control frame. Various types of information related to the multi-chassis link aggregation including whether or not a multi-chassis link aggregation group MLAG is configured in the host device is retained by the multi-chassis link aggregation information retaining unit MLGI. The database control unit DBCTL includes and manages an address table FDB and a link table LDB.

Association relationships between the ports and the MAC addresses of terminals (servers) and the like connected to the ports are registered in the address table FDB. Link aggregation group LAG configuration states are registered in the link table LDB. For example, information indicating that the ports P1 and P2 are configured as a LAG is registered in the link table LDB when using the example of the port switch SWP1 in FIG. 1. Furthermore, information on the presence or absence of faults in the ports (P1 and P2 in this case) configured as a LAG is also registered in the LDB on the basis of the monitoring results of the port monitoring unit MONI.

The frame transfer control unit FFCTL includes a transfer destination selecting unit FFSEL and a transfer executing unit FFEX. The FFCTL controls the transfer of frames (actual data signals) between the ports (Pu1, Pu2, ..., P1, P2, ..., Pr) while causing the transfer destination selecting unit FFSEL and the transfer executing unit FFEX to perform processing based on information in the tables (FDB, LDB) of the database control unit DBCTL and information in the multi-chassis link aggregation information retaining unit MLGI.

Figure 5:
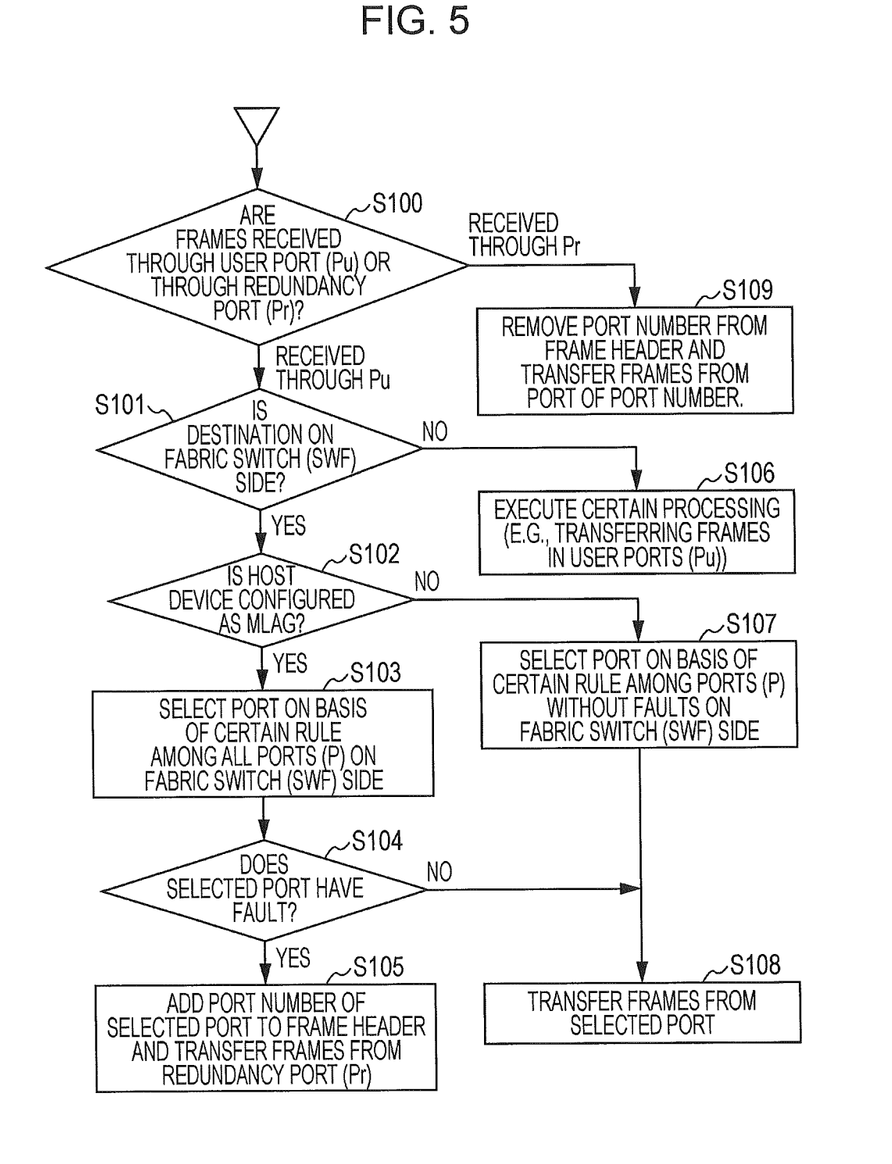
FIG. 5 is a flow chart illustrating an example of principal operations of a frame transfer control unit in FIG. 4.

FIG. 5 is a flow chart illustrating an example of principal operations of the frame transfer control unit in FIG. 4. In FIG. 5, the frame transfer control unit FFCTL first receives frames (actual data signals) through the user ports Pu1, Pu2, ..., or through the redundancy port Pr in the case of the port switches SWP1 and SWP2 in FIG. 1 (step S100). The FFCTL performs the processing in steps S101 to S108 when the frames (actual data signals) are received through the user port, and performs the processing in step S109 if the frames are received through the redundancy port Pr.

In steps S101 to S108, the frame transfer control unit FFCTL first refers to the address table FDB and the link table LDB to determine whether the destination MAC address included in the received frames is on the fabric switch (e.g., the fabric switches SWF1 or SWF2 in FIG. 2) side (step S101). If the destination MAC address is not on the fabric switch side, certain processing is executed to transfer the frames between the user switches (e.g., the user switches SWU1 and SWU2 in FIG. 3) based on the address table FDB (step S106).

Conversely, in step S101, if the destination MAC address is on the fabric switch (e.g., the fabric switches SWF1 and SWF2 in FIG. 3) side, the frame transfer control unit FFCTL (specifically, the transfer destination selecting unit FFSEL in FIG. 4) determines whether the host device ("the host device" here means the port switch performing the operation of this flow chart) is configured as the multi-chassis link aggregation group MLAG on the basis of the information in the multi-chassis link aggregation information retaining unit MLGI (step S102). If the multi-chassis link aggregation group MLAG is configured, the frame transfer control unit FFCTL (transfer destination selecting unit FFSEL) refers to the link table LDB to select one port on the basis of a certain rule from all the ports (fabric switch oriented ports) (e.g., ports P1 or P2 in port switch SWP2 in FIG. 2) in the link aggregation group LAG (step S103). In other words, either the communication path on the fabric switch SWF1 side or the communication path on the fabric switch SWF2 side is selected as the transmission destination of the received frames (actual data signals).

The frame transfer control unit FFCTL (transfer destination selecting unit FFSEL) decides the transfer destination port number by referring to the header information (e.g., transmission source and/or destination MAC addresses, etc.) in the frames (actual data signals) received in step S100, for example, and by performing computation processing using a hash function on the referenced header information as the certain rule when making the selection. Next, the frame transfer control unit FFCTL (specifically, the transfer executing unit FFEX in FIG. 4) determines whether there is a fault in the port (or the communication line for which the port is the connection source) selected in step S103 on the basis of the link table LDB (step S104).

If a fault is found to exist in step S104 (e.g., the case as in the port P1 in port switch SWP2 in FIG. 2), the frame transfer control unit FFCTL (transfer executing unit FFEX) functions as a first processing unit. The first processing unit adds the port number (first information) of the port selected in step S103 to the header information of the received frames (first actual data signals) and then transfers the frames (first actual data signals) through the shared communication line from the redundancy port Pr (step S105). In this case, while the port number is used as the first information under the assumption that a fabric switch is specified by the port number, the port number is not necessarily used, and any information that specifies the fabric switch as the original transfer destination may be used. Conversely, if no fault is found in step S104, the frame transfer control unit FFCTL (transfer executing unit FFEX) transfers the received frames from the port selected in step S103 as described in FIG. 1 (step S108).

Further, in step S102, if the host device is not configured as the multi-chassis link aggregation group MLAG (e.g., the case of port switch SWP3 in FIG. 1), the frame transfer control unit FFCTL (specifically, the transfer destination selecting unit FFSEL) performs the processing in step S107. In step S107, the frame transfer control unit FFCTL (transfer destination selecting unit FFSEL) refers to the link table LDB to select one port on the basis of the certain rule in the same way as step S103 from a port (fabric switch oriented port) with no fault in the link aggregation group LAG. Then, the frame transfer control unit FFCTL (specifically, the transfer executing unit FFEX in FIG. 4) transfers the received frames from the selected port in the abovementioned step S108.

Conversely, if frames (second actual data signals) are received through the redundancy port Pr in step S100, the frame transfer control unit FFCTL (specifically, the transfer executing unit FFEX in FIG. 4) functions as a second processing unit in step S109. The second processing unit obtains the port number (first information) from the header information of the frames (second actual data signals) received through the redundancy port Pr and transfers the frames (second actual data signals) from the port having the applicable port number to the certain fabric switch. Specifically, in step S105, the port switch (e.g., port switch SWP2 in FIG. 2) adds the port number (first information) to the header information and then transfers the frames (second actual data signals) from the redundancy port Pr. The port switch that receives the frames (e.g., port switch SWP1 in FIG. 2) transfers the frames (second actual data signals) to the fabric switch (e.g., the fabric switch SWF1 in FIG. 2) that is the same as the original transfer destination of the frames (second actual data signals) by obtaining the port number (first information) (e.g., port P1) from the frames (second actual data signals).

In this way, when frames (actual data signals) are transferred through the redundancy port Pr, the port switch (e.g., port switch SWP1 in FIG. 2) that received the frames is able to transfer the frames from a desired port (e.g., port P1) without carrying out particularly complex processing by using the method of adding the port number (first information) to the header. However, for example, since the port switches SWP1 and SWP2 select a port in the link aggregation group LAG based on the same rule that uses the transmission source MAC address and the destination MAC address, a method in which the port number is not added to the header may be used in a certain case. Specifically, in such a case, although the port switch does not need to carry out the processing for selecting a port on the basis of the transmission source MAC address and the destination MAC address for the frames received through the redundancy port Pr, frames received through the redundancy port Pr may be handled in the same way as frames received from a user switch.

By using the above port switches SWP as in FIGS. 4 and 5, the operations as described in FIGS. 1 to 3 can be realized and an improvement in fault tolerance and the suppression of a reduction in communication bandwidth accompanying flooding can be typically achieved. Further, the port switches SWP1 to SWP4 in FIG. 1 can be realized with box-type switch devices of the same configuration. While an example of a port switch is illustrated here, the fabric switches SWF1 and SWF2 in FIG. 1 may also be realized as box-type switch devices with the same constitution as the port switches. In the case of the fabric switch, the ports (Pu1, Pu2, . . . , P1, P2, . . . , Pr) in FIG. 4, for example, all become port switch oriented ports, and the frame transfer control unit FFCTL may transfer frames mainly between the port switch oriented ports on the basis of the address table FDB and the link table LDB.

While the invention of the present inventors has been explained in detail based on the embodiment above, the present invention is not limited to the embodiment and various changes may be made without departing from the scope thereof. For example, the abovementioned embodiment is a detailed description for easily explaining the present invention and not all of the configurations explained therein need to be included. Further, a portion of a configuration in one embodiment may be substituted for a configuration in another embodiment, or a configuration in an embodiment may be added to a configuration in another embodiment. Portions of a configuration in an embodiment may be erased or substituted, or another configuration may be added thereto.

For example, the port switches SWP and the fabric switches SWF are configured as box-type switch devices herein. By using a box-type fabric system that uses the box-type switch devices, various advantageous effects are obtained in comparison to a case of a system made up of chassis-type switch devices in which both functions of the abovementioned port switch and the fabric switch are contained in one housing. However, the present embodiment is not necessarily limited to a configuration of the box-type switch device, and the chassis-type switch device configuration may be used in some cases. The chassis-type switch device often includes a function for sharing the address table FDB and the like between fabric switches and if no problem arises as described in FIG. 8 in this case, the same effects are obtained when using a chassis-type switch device not having the function for sharing.

Furthermore, while an example of one multi-chassis link aggregation group MLAG being configured among a plurality of port switches has been described, it goes without saying that a configuration in which a plurality of MLAGs are configured may also be applied in the same way (e.g., port switches SWP1, SWP2 and port switches SWP3, SWP4 are each configured as MLAGs among six port switches SWP1 to SWP6). Further, while an example of a communication system using LAN switches (L2 switches) has mainly been described herein, the present invention can also be applied in the same way to a communication system using L3 switches.

What is claimed is:

1. A communication system, comprising:
a first port switch, a second port switch, and a third port switch;
a first fabric switch and a second fabric switch; and
a user switch,
wherein the first and second port switches each comprise a redundancy port,
wherein the redundancy port of the first port switch and the redundancy port of the second port switch are connected by a shared communication line,
wherein the user switch is connected to each of the first and second port switches through different second communication lines, and ports of the user switch that are connection sources of the second communication lines are configured for link aggregation,
wherein the first port switch, the second port switch, and the third port switch are each connected to the first and second fabric switches through different first communication lines, and ports of each of the first port switch, the second port switch, and the third port switch that are connection sources of the first communication lines are configured for link aggregation,
wherein the ports of the first and second fabric switches, which are the connection sources of the first communication lines connected to the first and second port switches, are configured for link aggregation,
wherein, when there is no fault, the second port switch transfers actual data signals received from the user switch through the second communication line to the third port switch through the first communication line between the second port switch and the first fabric switch, and when there is a fault in the first communication line between the second-port switch and the first fabric switch and there is not a fault in the first communication line between the second port switch and the second fabric switch, the second port switch transfers the actual data signals to the first port switch through the shared communication line and does not transfer the actual data signals to the second fabric switch through the first communication line between the second port switch and the second fabric switch, and
wherein the first port switch transfers the actual data signals received through the shared communication line to the third port switch through the first communication line between the first port switch and the first fabric switch.

2. The communication system according to claim 1, wherein, when there is a fault in the first communication line between the second port switch and the first fabric switch, the second port switch adds first information that indicates that the original transfer destination is the first fabric switch side to the actual data signals and then transfers the actual data signals to the first port switch through the shared communication line, and
wherein the first port switch transfers the actual data signals to the third port switch through the first communication line between the first port switch and the first fabric switch by obtaining the first information from the actual data signals received through the shared communication line.

3. The communication system according to claim 2, wherein the first port switch, the second port switch, and the third port switch are constituted by box-type switch devices, and
wherein the first and second fabric switches are constituted by box-type switch devices.

4. The communication system according to claim 1, wherein, when there is the fault in the first communication line between the second port switch and the first fabric switch, the fault is between a first port of the second port switch and a second port of the first fabric switch.

5. The communication system according to claim 4, wherein the first port switch transfers, through a first port of the first port switch, the actual data signals received through the shared communication line to a first port of the first fabric switch.

6. The communication system according to claim 5, wherein the first fabric switch transfers, through a third port of the first fabric switch, the actual data signals received from the first port of the first port switch to a first port of the third port switch.

7. The communication system according to claim 6, wherein a first port of the second fabric switch is coupled to a second port of the first port switch.

8. The communication system according to claim 7, wherein a second port of the second fabric switch is coupled to a second port of the second port switch.

9. The communication system according to claim 1, wherein, when there is the fault in the first communication line between the second port switch and the first fabric switch, and when the third port switch receives the actual data signals through a terminal connected thereto, the third port switch transfers the actual data signals to the first fabric switch.

10. The communication system according to claim 9, wherein, when there is the fault in the first communication line between the second port switch and the first fabric switch, and when the first fabric switch receives the actual data signals from the third port switch, the first fabric switch transfers the actual data signals to the first port switch.

11. A network relay device, comprising:
a first and a second port that include fabric switch oriented ports for respectively connecting to two fabric switches and that are configured for link aggregation;

a redundancy port for connecting to a port switch through a shared communication line;

a user switch oriented port for connecting to a user switch;

a frame transfer control unit that selects a transfer destination of first actual data signals received at the user switch oriented port from the first and the second port and transfers the first actual data signals from the first port or the second port which is selected as the transfer destination of the first actual data signals; and a port monitoring unit that detects a presence or an absence of a fault in the first and second ports, wherein the frame transfer control unit includes:

in a case where there is a fault in the first port and there is not a fault in the second port, a first processing unit for transferring the first actual data signals from the redundancy port to the port switch and not transferring the first actual data signals from the second port to the fabric switch when the first port in which the fault is detected by the port monitoring unit is selected as the transfer destination of the first actual data signals; and a second processing unit for transferring second actual data signals to a fabric switch that is the same as the original transfer destination of the second actual data signals when the second actual data signals are received from the port switch through the redundancy port.

12. The network relay device according to claim 11, wherein the first processing unit adds first information that indicates the first port selected as the transfer destination of the first actual data signals to the first actual data signals and transfers the first actual data signals from the redundancy port to the port switch, and wherein the second processing unit transfers the second actual data signals to the fabric switch that is the same as the original transfer destination of the second actual data signals by obtaining the first information included in the second actual data signals.

* * * * *